March 19, 1957 H. W. KAUFMANN 2,786,147

MAGNETIC BISTABLE DEVICE

Filed April 19, 1954

INVENTOR

HENRY WILLIAM KAUFMANN

[signature]

ATTORNEY

United States Patent Office 2,786,147

Patented Mar. 19, 1957

2,786,147

MAGNETIC BISTABLE DEVICE

Henry William Kaufmann, Phoenixville, Pa., assignor, by mesne assignments, to Sperry Rand Corporation, New York, N. Y., a corporation of Delaware Application April 19, 1954, Serial No. 424,059

20 Claims. (Cl. 307—88)

The present invention relates to bistable devices in the nature of flip-flops, and is more particularly concerned with such devices comprising magnetic amplifiers.

Bistable devices are one of the basic circuits utilized in many present day electronic and electrical applications, notably in computing applications. One such form of bistable device has been termed a "flip-flop," and such devices are characterized by the fact that the device itself has two input lines, whereby a pulse or signal input of a given polarity on one of the said lines will cause the device to assume one stable state, and a further pulse or signal of the said given polarity on the other of said lines causes the device to change to a second stable state. In this respect it should further be noted that once having assumed a given stable state due to a signal input on one of the said lines, further signals of the same given polarity on the same line will not cause the device to revert to the other of its stable states, but, on the contrary, a signal on the other line is necessary for such a change to occur.

In the past, bistable devices or flip-flops have normally been constructed in the form of vacuum tube circuitry, and while such circuitry has, in general, performed with acceptable results, the vacuum tube construction has been subject to several disadvantages. First, such vacuum tube circuits are of relatively large size, making disposition of components rather difficult. Second, vacuum tube circuits are subject to breakage and as a result make for a relatively fragile system; and third, in the normal course of operation, such circuits are subject to operating failures, thus raising serious questions of maintenance and of the cost attendant thereto.

In an attempt to reduce operational failures to a minimum, other forms of electrical devices have been suggested for use in bistable devices. One such other form is the magnetic amplifier, and it is with this type of bistable device that the present invention is primarily concerned.

It is accordingly a prime object of the present invention to provide a bistable device which is both inexpensive to construct and which exhibits considerable ruggedness.

A further object of the present invention resides in the provision of a bistable device in the nature of a flip-flop, which utilizes magnetic amplifier stages in the operation thereof.

Still another object of the present invention resides in the provision of a bistable device which comprises complementing magnetic amplifiers and an interconnecting network for establishing two stable states.

A still further object of the present invention is the provision of a bistable device which can be made in relatively small sizes.

In accordance with the foregoing objects, I provide a bistable device which comprises, as basic elements thereof, two complementing magnetic amplifiers. In this respect it should be noted that a complementing amplifier is by definition one which will give an output when no input is present thereto; or on the contrary, will give no output when there is in fact an input. Recognizing this basic consideration, the bistable device of my invention utilizes two complementing amplifiers interconnected "head to tail" whereby a sufficient fraction of the output of one of the said amplifiers is fed back as an input to the other, maintaining the other of said amplifiers in a non-output producing state. If an input pulse should be applied to the amplifier in an operating condition, the said input causes the operating amplifier to be cut off, thus discontinuing the output therefrom as well as the feedback to the other of said magnetic amplifiers, thereby causing the other of said amplifiers to commence producting output signals in turn. As a result of this simple structure, I effect a most reliable bistable device. Further, inasmuch as the input lines are separately connected to each of the said amplifiers, whereby pulses on any one of the said lines will cause a discontinuance of the output from its corresponding amplifier only if the said amplifier is in an operating condition, the bistable device of my invention is truly a flip-flop device.

The foregoing objects, advantages and operation of my invention will become more readily apparent from the following description and accompanying drawings, in which.

Figure 4:
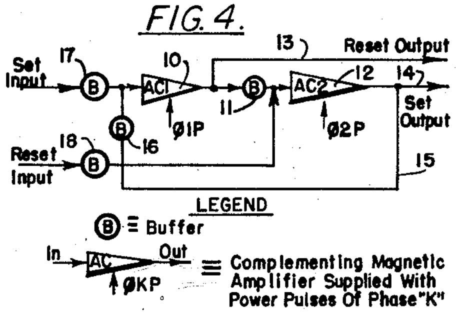
Figure 4 is a schematic, in logical form, of a bistable device in accordance with the present invention.
Figure 5:
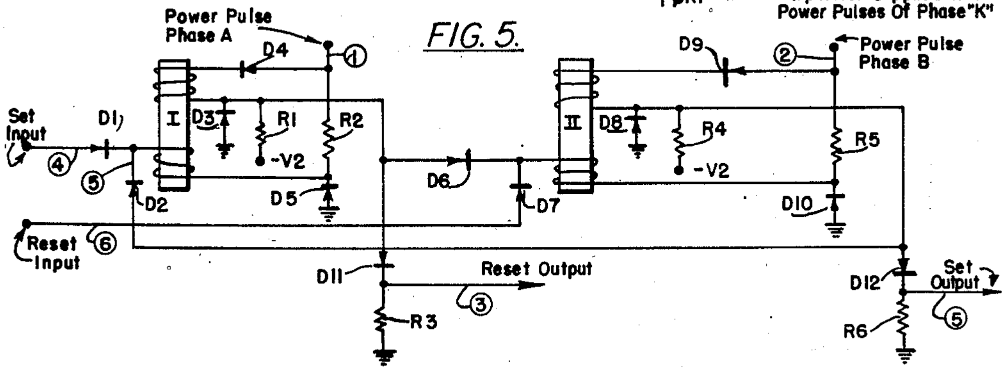
Figure 5 is a circuit diagram of the bistable device of Figure 4.
Figure 6:
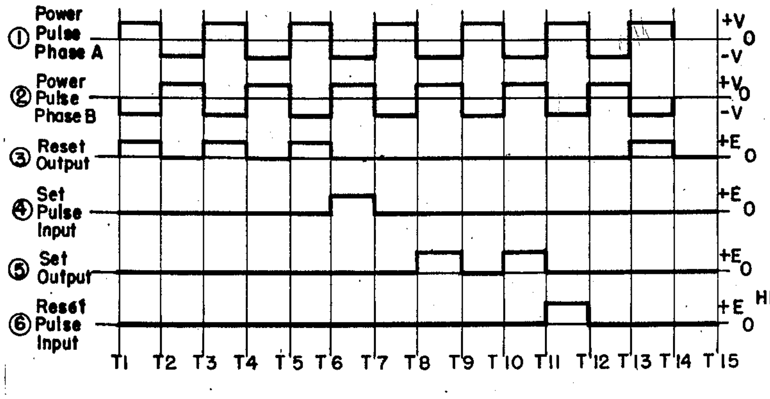

Figure 6 (wave forms 1 through 6 inclusive) are wave form diagrams illustrating the operation of the bistable device shown in Figures 4 and 5.

Figure 1:
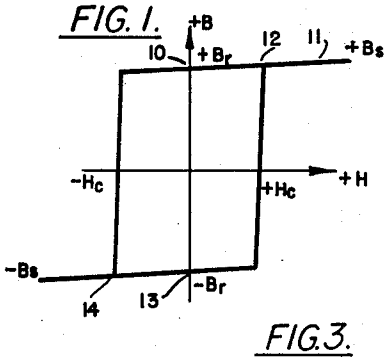
Figure 1 is an idealized hysteresis loop of a magnetic material which may be employed in the cores of the magnetic amplifiers comprising my bistable device.

Referring now to Figure 1, it will be seen that the magnetic cores utilized in the magnetic amplifier stages of my bistable device preferably exhibit a substantially rectangular hysteresis loop. Such cores may be made of a variety of materials, among which are various types of ferrites and various kinds of magnetic tapes, including Orthonik and 4–79 Moly-Permalloy. These materials may have different heat treatments to give them different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It is therefore to be understood that the invention is not limited to any specific geometries of the cores or to any specific materials therefor, and that the examples given are illustrative only. In the following description a bar type core has been utilized for ease of representation and for facility in showing winding directions. Further, the following descrpition refers to the use of materials having hysteresis loops substantially the same as that shown in Figure 1, again for ease of discussion. Neither of these requirements however is mandatory and many variations in both material and core configuration will readily suggest themselves to those skilled in the art.

Returning now to the hysteresis loop shown in Figure 1, it will be noted that the curve exhibits several significant points of operation: namely, point 10 (plus $B_r$) which represents a point of plus remanence; the point 11 (plus $B_s$) which represents plus saturation; the point 12, which is a point substantially intermediate plus remanence and plus saturation, but which represents a point somewhat less than full saturation of the core; the point 13 (minus $B_r$) which represents minus remanence; and the point 14, which is a point intermediate minus $B_r$ and minus $B_s$ (minus saturation), and is directly analogous to the point 13 on the positive portion of the curve. Discussing for the moment the operation of a device utilizing a core which exhibits a hysteresis loop such as is shown in Figure 1, let us assume that a coil is mounted or wound on such a core. If we should initially assume that the core is at an operating point 10 (plus remanence), and if a current should be passed through the said coil on the said core causing a magnetizing force in a direction of plus H, that is in a direction tending to strengthen the flux output of the said core in the same direction, the core will tend to be driven from point 10 (plus $B_r$) to point 11 (plus $B_s$). During this state of operation, there is relatively little flux change through the said coil and the coil therefore presents a relatively low impedance, and energy fed to the said coil during this state of operation will pass readily therethrough. Thus, if a load is attached to one end of the said coil, and a pulse is passed through the said coil tending to drive the core from point 10 to point 11, substantially all of the energy present in the said pulse will appear in the output. On the other hand, if the core should somehow be "flipped" from point 10 (plus $B_r$) to point 13 (minus $B_r$) prior to the application of a "plus H" pulse upon application of such a pulse the core will tend to be driven from point 13 (minus $B_r$) to the region of point 12 or point 11. During this particular state of operation, there is a very large flux change through the said coil and the coil therefore presents a relatively high impedance to the applied pulse. As a result, substantially all of the energy applied to the coil, when the core is initially at minus $B_r$, will be expended in flipping the core from point 13 to the region of point 12 with very little of this energy actually passing through the said coil to give a usable output. Thus, depending upon whether the core is initially at point 10 (plus $B_r$) or at point 13 (minus $B_r$), an applied pulse in the "plus H" direction will be presented with either a low impedance or a high impedance and will effect either a relatively large output or a relatively small output. These considerations are of great value in the construction of a simple magnetic amplifier such as is shown in Figure 2.

Figure 2:
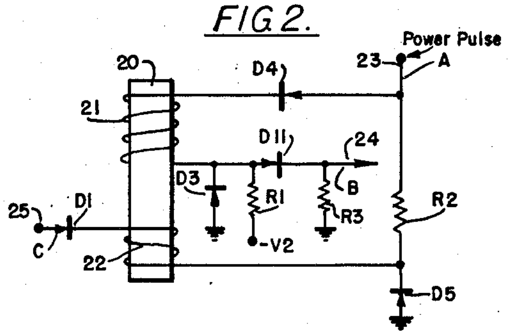
Figure 2 is a schematic representation of a simple complementing amplifier of the magnetic type.
Figure 3:
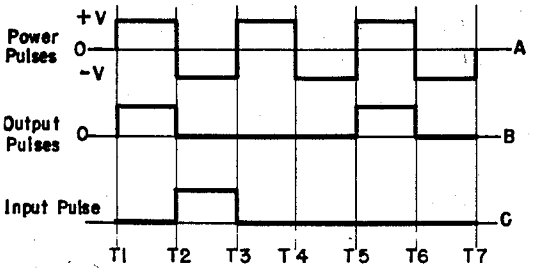
Figure 3 (*a*, *b* and *c*) are wave forms illustrating the operation of the device of Figure 2.

Referring now to the circuit shown in Figure 2, and making reference to the wave form diagrams of Figure 3 (*a* through *c*), it will be seen that the magnetic amplifier in accordance with the present invention comprises a core 20, exhibiting a hysteresis loop substantially the same as that discussed in reference to Figure 1. The points A, B and C of Figure 2 refer to the corresponding waveforms of Figure 3. The core 20 bears two windings thereon, namely, a winding 21, which is normally termed the power or output winding, and a winding 22 which is termed the signal or input winding. One end of the power winding 21 is coupled through a diode D4, poled as shown, to an input terminal 23 to which terminal is fed a train of positive and negative going power pulses such as is shown in Figure 3*a*. For purposes of the following discussion, the power pulses are shown to have a center value of zero volts and to exhibit excursions between plus and minus v. volts. As will be seen from Figures 2 and 3, and assuming that the core 20 is initially at the plus remanence point (point 10 of Figure 1), a positive going power pulse applied at terminal 23 during the time $t_1$ to $t_2$, will pass through the diode D4 through the relatively low impedance exhibited by coil 21 and thence to an output point 24. At the end of time $t_2$, and in the absence of any other signal inputs, the core will come back to the operating point 10, and will remain at the said point 10 until a further positive going power pulse, applied during the times $t_3$ to $t_4$, will again drive the core to plus saturation (point 11 of Figure 1), again effecting an output at point 24. Thus, in the absence of any other inputs, if the core 20 should initially be at plus $B_r$ successive positive going power pulses will cause successive outputs to appear at point 24.

Let us now assume, however, that an input pulse is applied during the time $t_2$ to $t_3$, such as is shown in Figure 3*c*. The input pulse passes through the diode $D_1$, and through signal coil 22. As will be noted from Figure 2, inasmuch as the coil 22 is wound in a direction opposite to that of coil 21 the said input pulse will effect a "minus H" magnetizing force on the core 20. Thus, during the times $t_2$ to $t_3$ the application of an input pulse will cause the core to be flipped in a counterclockwise direction from point 10 (plus $B_r$) to the region of point 14, shown in Figure 1, and at the end of time $t_3$ the core will be at the operating point 13 (minus $B_r$) preparatory to the reception of the next positive going power pulse. This next power pulse appearing at terminal 23 during the times $t_3$ to $t_4$ will find that the coil 21 presents a relatively high impedance and as a result most of the energy present in the said $t_3$—$t_4$ power pulse will be expended in flipping the core back to the region of point 12 rather than in producing a usable output. Thus, as will be seen from an examination of Figure 3, the application of an input pulse during the time $t_2$ to $t_3$ effectively prevents the output of a usable pulse during the times $t_3$ to $t_4$. The system thus acts as a complementer. If, once more (and as is shown in Figure 3), no further input pulse is applied during the times $t_4$ to $t_5$, an output pulse will once more appear during the times $t_5$ to $t_6$, for, inasmuch as the positive going power pulse appearing between times $t_3$ and $t_4$ caused the core to once more assume its plus remanence operating point, the next positive going power pulse between times $t_5$ and $t_6$ will find the core to still be at this operating point and will drive the core to plus saturation giving the required output.

Several incidental considerations should be noted from the foregoing discussion. First of all, the passage of energy through coil 21, due to the application of a positive going power pulse at terminal 23, will cause a flux change to occur in the core 20 and this flux change will in turn tend to induce a voltage in the signal coil 22. This induced voltage is negative at the cathode of $D_1$ and positive at the cathode of $D_5$; and although the induced voltage is small, it is nevertheless necessary to prevent current from flowing in the lower winding 22 due to this small induced voltage. The combination of resistor $R_2$ and diode $D_5$ accomplishes this function by allowing the lower end of winding 22, connected to the junction of the said resistor $R_2$ and diode $D_5$, to attain the potential of the applied power pulse when the power pulse is positive. Since the base level of the input pulse applied to terminal 25 (and of the feedback pulses to be discussed in respect to Figures 4 and 5) is zero volts, no current can flow. Thus, the induced voltage is in effect suppressed and cannot cause faulty operation of the device.

Again, if the core 20 is assumed to be at minus $B_r$, then, as was previously discussed, a positive going power pulse will cause the core to move from minus remanence to the region of plus saturation and the coil 21 presents a large inductive reactance so that the current in the power coil 21 is small. Even though no appreciable output pulse occurs, however, the flux change is large and a relatively large voltage is induced in the lower winding 22. However, the blocking action of the $R_2$—$D_5$ circuit still prevents current from flowing in the lower winding 22 if there are fewer turns on the said lower winding than on the power winding 21. It is well known in the art that this relationship between the number of turns on the windings must exist if a voltage gain is to be produced by the amplifier.

It should further be noted that when the power pulse (shown in Figure 3*a*) becomes negative ($t_2$—$t_3$; $t_4$—$t_5$, etc.), only a negligible current can flow in D4. (In this respect it has been assumed that the back resistance of the several diodes is infinite and that the forward resistance is zero. While this is not strictly true, these assumptions are convenient and do not substantially effect the explanation.) Even though no current flows through the diode $D_4$ upon application of the negative going portion of the power pulse at terminal 23, current still flows in the $R_2$—$D_5$ circuit, the magnitude of this current being approximately $$\frac{V}{R_2}$$

(inasmuch as the magnitude of the power pulse is V). This current serves to hold the end of lower winding 22, connected to the junction of $R_2$ and $D_5$, at approximately ground level, and it is accordingly during these time periods, namely during the negative going portions of the power pulse input, that the device can accept an input signal at terminal 25. The complete circuit for a signal input is thus from terminal 25 through diode $D_1$, through coil 22, to the junction of resistor $R_2$ and diode $D_5$, which junction is approximately at ground level. Again, it must further be noted that the current which flows as a result of an input pulse at terminal 25 must produce sufficient magnetizing force to flip the core 20 from plus remanence to minus remanence during the input pulse period. This value of current must not exceed the value $$\frac{V}{R_2}$$

but this condition is easily arranged by proper choice of resistor $R_2$.

A still further consideration is that, even though the core 20 should initially be at its minus remanence point (due to the prior application of an input signal at terminal 25), a positive going power pulse, in flipping the core from the minus remanence point to the plus remanence point, will still cause a small current to flow through the coil 21 and a small output to appear at terminal 24. This small output is termed a "sneak output," and should desirably be suppressed. This suppression is effected by resistor $R_1$ connected between a source of voltage minus $V_2$ and the lower end of coil 21, and the diode $D_3$, connected between the lower end of power winding 21 and ground. The resistance $R_1$, is so chosen that a current flows from minus $V_2$ through $R_1$, through diode $D_3$ to ground, which current has a magnitude equal to that of the sneak pulse current. Thus, the combination of resistor $R_1$ and diode $D_3$ effectively suppresses the small current output of the so-called sneak output, while permitting the larger output, representative of no signal input, to appear at terminal 24.

Summarizing the foregoing discussion, it will be seen that the circuit of Figure 2 is a complementing magnetic amplifier wherein outputs will appear from the said amplifier so long as no input signal is presented to the amplifier during negative going portions of the power pulses applied, and on the other hand, no output will appear immediately following the application of such an input pulse. As will be apparent to those skilled in the art, by reversal of the several diodes shown, and by appropriate change in the several potentials utilized, the magnetic amplifier may be so operated that input pulses must occur during positive going portions of the applied power pulses, and the amplifier output occurs during negative going portions of the said power pulses. Such structural changes are intended to fall within the scope of the present invention. Magnetic amplifiers of the type described lend themselves readily to use in the bistable device of the present invention.

Referring now to Figure 4, I have shown a bistable device in the nature of a flip-flop in accordance with the present invention, which bistable device utilizes magnetic amplifiers such as are shown in Figure 2. Immediately below Figure 4 I have presented the legend for the logical representations shown in the said Figure 4. The bistable device of the present invention comprises a complementing magnetic amplifier $A_{c1}$, labelled 10, the output of which is connected through a buffer 11 to the input of a further complementing amplifier $A_{c2}$, labelled 12. The output of the complementing amplifier 12 appears at set output 14 and a portion of the said set output is in turn fed back through a line 15 and buffer 16 to the input of magnetic amplifier 10. Provision is also made for the application of a set input through a buffer 17 to the input of magnetic amplifier 10 as well as for the application of a reset input through the further buffer 18 to the input of amplifier 12. Whenever outputs are presented by the magnetic amplifier 10, these are also taken from a reset output line 13. Discussing now the operation of the logical circuit shown in Figure 4, let us assume that complementing amplifier 12 is in an operating state, namely, output pulses are appearing at set output 14 signifying that no inputs are being fed to the input of the said amplifier 12. The outputs from amplifier 12 are fed back through line 15 and buffer 16 to the input of magnetic amplifier 10 and, as the preceding discussion has demonstrated, these inputs to amplifier 10 will effectively prevent any output therefrom. Thus, no outputs will appear on the reset output line 13, nor will any output be fed through buffer 11 to the input of amplifier 12. We thus have a first stable state wherein output signals are present on the set output line 14 and no output signals are present on the reset output line 13. If an input signal is now applied at the reset input as shown, this input signal is fed through buffer 18 to the input of magnetic amplifier 12. The presence of such a reset input signal causes magnetic amplifier 12 to cease producing outputs on line 14 and signals are no longer fed back to the input of amplifier 10. The absence of such inputs to amplifier 10 thus causes an output to appear on reset output line 13 and these outputs also feed through buffer 11 to the input of amplifier 12, maintaining the said amplifier 12 in a cut off condition. Thus the application of a reset input through buffer 18 has caused the bistable device of Figure 4 to assume a second stable state, namely, one in which no output appears on set output line 14 and output pulses do appear on reset output line 13. Again, if a set input pulse should now be applied through buffer 17 to the input of magnetic amplifier 10, this set input will stop the output from the said amplifier 10, thereby stopping inhibition inputs to amplifier 12, causing outputs to appear once more at set output line 14 and as a result, the bistable device once more reverts to its initial stable state.

The actual circuit diagram of the logical representation of Figure 4 is shown in Figure 5; and as will be seen from an examination of the said Figure 5, this device utilizes two complementing magnetic amplifiers of the type shown in Figure 2 interconnected as shown in Figure 4. The power pulses applied to the two complementing magnetic amplifiers shown in Figure 5 are of differing phases, namely, of phase A and of phase B. This difference in phase actually means that a positive going power pulse is applied to one of the said amplifiers while a negative going power pulse is applied to the other of said amplifiers. The reason for this difference in phase will become readily apparent from an examination of the wave forms shown in Figure 6. In respect to these wave forms, it should be noted that they have been labelled 1 through 6 inclusive and that Figure 5 carries circled numerals 1 through 6 showing points in the circuit wherein these wave forms will appear. Again it must be stressed that, while I have shown input pulses to occur during negative going portions of corresponding power pulses, the inputs can in fact occur during positive going power pulse portions, by appropriate circuitry change, whereby outputs occur during negative going power pulse portions.

Studying the wave forms of Figure 6, the wave forms 1 and 2 show the power pulses of phase A, and phase B respectively applied to the two amplifiers, having cores I and II, of Figure 5. Assuming that the left hand amplifier of Figure 5 (having the magnetic core I) is initially in an operating state (no input pulses thereto), it will be seen that during the times $t_1$ to $t_2$, $t_3$ to $t_4$, and $t_5$ to $t_6$, for instance, reset outputs will appear in coincidence with the application of positive going power pulses of phase A. These reset outputs are fed through the diode $D_{11}$ and are taken from resistor $R_3$. They further feed through diode $D_6$ to the signal winding of magnetic amplifier II, and, because of the difference in phases between the power pulse applied to the two amplifiers, prevent any output from appearing from amplifier having core II. This follows inasmuch as the reset outputs from magnetic amplifier I comprise a series of pulses fed to the signal winding of magnetic amplifier II during the times that the pulses of power pulse phase B are negative going. If we should assume now that a set pulse input is applied to the signal winding of magnetic amplifier I, during the time $t_6$ to $t_7$ as shown, this will cause the magnetic amplifier I to cut off, in accordance with the previous discussion. As a result, no input pulse appears at the signal winding of amplifier II during time $t_7$ to $t_8$, and the said magnetic amplifier II will commence producing outputs during the times $t_8$ to $t_9$, $t_{10}$ to $t_{11}$, etc. These output pulses are in turn fed back through the diode $D_2$ to continue inhibiting outputs from the magnetic amplifier I thereby to assure that magnetic amplifier II will continue producing outputs until a reset input is fed thereto. Such a reset input has been shown in wave form 6 of Figure 6, and assuming that this pulse occurs as shown during the times $t_{11}$ to $t_{12}$, no output will appear from magnetic amplifier II during time $t_{12}$ to $t_{13}$; no input is therefore fed to the magnetic amplifier I during the same time $t_{12}$ to $t_{13}$, and the magnetic amplifier I will once more commence producing reset outputs during the times $t_{13}$ to $t_{14}$, etc. In respect to the several circuit components shown, the diode $D_1$ corresponds to buffer 17 of Figure 4, diode $D_7$ corresponds to buffer 18 of Figure 4, and diode $D_6$ corresponds to buffer 11 of Figure 4. Similarly, resistor $R_4$ and diode $D_8$ correspond to the sneak output suppression circuit of resistor $R_1$ and diode $D_3$, previously discussed; and the voltage path $R_5$—$D_{10}$ corresponds to the further voltage path $R_2$—$D_5$, previously discussed. In fact, as will become readily obvious from a comparison of the component portions of Figure 5 and the schematic showing of Figure 2, the magnetic amplifiers utilized in Figure 5 are identical in circuitry with one another and are interconnected through appropriate buffers as shown in Figure 4. The circuit of Figure 5 in fact possesses bilateral symmetry and except for the difference in phases of power pulses applied, the operation of the magnetic amplifier having core I is precisely the same as that of the magnetic amplifier having core II. In this connection it should be noted that in Fig. 4, the phase A and phase B power pulses are represented in Fig. 4 as $\phi$1P and $\phi$2P respectively. The disposition of resistors $R_3$ and $R_6$ show how the circuit may be effectively loaded to obtain, respectively, reset and set outputs therefrom. Diodes $D_{11}$ and $D_{12}$ connected to the said resistors $R_3$ and $R_6$, serve to isolate the bistable circuit of Figure 5 from the outputs of other circuits which may in turn have their outputs connected to the output of the bistable circuit, and these diodes $D_{11}$ and $D_{12}$ also isolate load resistors $R_3$ and $R_6$ from the small voltage drops present across sneak suppressor diodes $D_3$ and $D_8$, respectively. In practice, the several diodes $D_1$ to $D_{12}$ inclusive may take the form of germanium crystals such as the types 1 N 34 and 1 N 48, etc.; and when such construction is employed, the overall bilateral device is extremely rugged in construction, and may be made in very small sizes.

While I have shown a preferred embodiment of my invention, variations will readily suggest themselves to those skilled in the art, and these variations are meant to fall within the scope of the present invention.

I claim:

1. A bistable device comprising first and second complementing magnetic amplifiers, first means connecting the output of said first amplifier to the input of said second amplifier, second means connecting the output of said second amplifier to the input of said first amplifier, and means for selectively applying controlling input signals to said first and second magnetic amplifiers for selectively inhibiting outputs from a selected one of said amplifiers.

2. The bistable device of claim 1 wherein each of said first and second means includes buffer means.

3. The device of claim 1 wherein said last-named means comprises a pair of substantially independent input lines connected respectively to each of said magnetic amplifiers whereby external control pulse inputs may be selectively applied to said magnetic amplifiers, and a pair of mutually isolated output lines coupled respectively to said first and second amplifiers whereby separate outputs may be taken from each of said amplifiers.

4. A bistable device comprising first and second magnetic amplifiers, each of said amplifiers including a magnetic core exhibiting a substantially rectangular hysteresis loop each of which cores carries both a power winding and a signal winding thereon, means for producing regularly occurring power pulses coupled to each of said power windings, coupling means for coupling the power winding of each of said amplifiers to the signal winding of the other of said amplifiers, and further input means for selectively and independently coupling external control signals to the signal windings of each of said amplifiers.

5. The bistable device of claim 4 in which said coupling means comprises a diode buffer interposed between the power winding of each of said amplifiers and the signal winding of the other of said amplifiers, two separate load means responsive respectively to outputs from each of said magnetic amplifiers, and further buffer means interposed between each of said power windings and said load means.

6. The bistable device of claim 5 in which each of said magnetic amplifiers is a complementer.

7. The bistable device of claim 6 in which the power pulses applied to the power winding of one of said amplifiers differs in phase from the power pulses applied to the power winding of the other of said amplifiers.

8. A bistable device comprising first and second magnetic amplifiers, each of said amplifiers comprising a core of magnetic material exhibiting a substantially rectangular hysteresis loop, a power winding and a signal winding on each of said cores, means coupling a source of power pulses to one end of each of said power windings, means coupling the other end of the power windings of each of said amplifiers to one end of the signal winding of the other of said amplifiers, voltage paths comprising a series impedance and diode connected to said source of power pulses, the other end of each of said signal windings being connected respectively to the junction points of said impedances and diodes.

9. The bistable device of claim 8 in which said source of power pulses comprises means generating a train of regularly occurring substantially square wave pulses of a first phase coupled to one of said power windings, and means generating a train of regularly occurring substantially square wave pulses of a second phase coupled to the other of said power windings.

10. The bistable device of claim 9 wherein further input lines are coupled through buffers to one end of each of said signal windings, whereby external control signals may be selectively and independently applied to each of said signal windings.

11. The device of claim 10 wherein said source of power pulses applied to each of said amplifiers causes said power pulses to be both positive and negative going, said external control signals being selectively applied to each of said magnetic amplifiers during a negative going excursion of a power pulse applied to said amplifier, and load means coupled to each of said power windings through buffer means whereby outputs may be selectively taken from each of said magnetic amplifiers during positive going excursions of the power pulses applied to said amplifier.

12. The device of claim 10 wherein said source of power pulses applied to each of said amplifiers causes said power pulses to be both positive and negative going, said external control signals being selectively applied to each of said magnetic amplifiers during a positive going excursion of a power pulse applied to said amplifier, and load means coupled to each of said power windings through buffer means whereby outputs may be selectively taken from each of said magnetic amplifiers during negative going excursions of the power pulses applied to said amplifier.

13. A bistable device comprising a pair of complementing magnetic amplifiers, means coupling the output of each of said magnetic amplifiers to the input of the other of said amplifiers whereby when one of said amplifiers is in an output producing state it will effectively inhibit outputs from the other of said amplifiers, and further input means coupled to the inputs of each of said amplifiers whereby an external signal may be selectively applied to the input of the output producing magnetic amplifier of said bistable device thereby to cause said bistable device to assume a different stable state of operation.

14. The bistable device of claim 13 including separate load means associated respectively with each of said magnetic amplifiers, and buffer means coupling each of said amplifiers to its respective load means.

15. The bistable device of claim 14 including means for energizing each of said amplifiers comprising a source of positive and negative going power pulses, said further input means causing said external signals to be applied selectively to each of said amplifiers during a predetermined polarity of excursion of the power pulses applied to said amplifiers, whereby an output selectively appears across said load means during the other polarity of excursion of the power pulses applied to said amplifier.

16. The bistable device of claim 1 wherein each of said amplifiers includes a core of magnetic material exhibiting a substantially rectangular hysteresis loop.

17. A bistable device comprising first and second complementing amplifiers, means coupling the output of said first amplifier to the input of said second amplifier, means coupling the output of said second amplifier to the input of said first amplifier whereby an output from either of said amplifiers inhibits an output from the other of said amplifiers, and means for selectively coupling control signals to the input of each of said amplifiers, whereby the application of a control signal to the input of a selected one of said amplifiers will inhibit an output from said selected amplifier thereby to permit the other of said amplifiers to produce an output.

18. A flip-flop comprising first and second pulse type complementing magnetic amplifiers, coupling means connecting the output of each of said amplifiers to the input of the other of said amplifiers whereby outputs from either of said amplifiers inhibits outputs from the other of said amplifiers, a pair of control input lines coupled respectively to the inputs of said first and second amplifiers, and means coupling selective control pulses to a selected one of said pair of lines whereby the output producing one of said first and second amplifiers may be selectively inhibited thereby to permit an output from the other of said amplifiers.

19. The flip-flop of claim 18 wherein said coupling means couples a predetermined portion of the output of each of said amplifiers to the input of the other of said amplifiers, and a pair of mutually isolated output lines coupled respectively to said first and second amplifiers whereby independent outputs may be taken from said first and second amplifiers.

20. The flip-flop of claim 18 wherein each of said amplifiers includes a core of magnetic material exhibiting a substantially rectangular hysteresis loop.

References Cited in the file of this patent

UNITED STATES PATENTS

| | | |
|---|---|---|
| 2,574,438 | Rossi et al. | Nov. 6, 1951 |
| 2,654,080 | Browne | Sept. 29, 1953 |
| 2,666,151 | Rajchman et al. | Jan. 12, 1954 |